Dec. 25, 1956 W. L. CADMAN 2,775,418
FISHING REEL ARBOR
Filed Nov. 4, 1952

INVENTOR.
WILLIAM L. CADMAN
BY
Charles S. Penfold
ATTORNEY

United States Patent Office 2,775,418
Patented Dec. 25, 1956

2,775,418

FISHING REEL ARBOR

William L. Cadman, Bronson, Mich., assignor to Higbie Manufacturing Company, a corporation of Michigan Application November 4, 1952, Serial No. 318,707

1 Claim. (Cl. 242—119)

This invention relates generally to fishing tackle, and more particularly is directed to an accessory or arbor fitting adapted for association with the spool of a fishing reel.

The subject invention contemplates the utilization of an arbor which is adapted to be detachably connected to a conventional shaft or a spool in order to facilitate and expedite the proper delivery and return of the line, particularly while casting. Thus, the owner of a conventional reel may promote its efficiency by the simple expedient of attaching thereto the arbor embodying the improved principles of design and construction of the subject invention. It is to be understood that insofar as the subject invention is concerned the arbor sections may also provide a support for film, tape or other line material.

One of the principal objects of the invention is to provide an arbor preferably comprised of a minimum number of corresponding sections or parts which can be easily and quickly assembled and disassembled with respect to a spool an unlimited number of times.

An important object of the invention is to provide an arbor of the character just referred to, in which each of the sections preferably includes shaft-engaging bearing means and at least a pair of corresponding locking means or components, the locking means on the sections serving to secure the sections about a shaft of a spool.

A significant object of the invention is to provide an arbor in which each section thereof is preferably moulded in the form of a semi-cylindrical shell having an outer cylindrical material supporting wall and a pair of corresponding end walls or portions for engaging a shaft.

Another object of the invention is to provide the shell constituting each arbor section with internal web structure for reinforcing the shell and a central disposed bearing formation for engaging a shaft, the formation having means for keying the section to a shaft.

Another object of the invention is to form the end walls on each section so they will receive or accommodate the end flanges of the spool.

A specific object of the invention is to preferably locate the locking means at the points or lines of junction between the end walls and the outer cylindrical line supporting wall. In other words, the locking means are preferably disposed at the corners of each arbor section and/or on the end walls.

Another object of the invention is to provide each of the arbor sections with a plurality of longitudinal slots so that a line can be passed through one or more slots in either or both sections and about the arbor so the line will tend to maintain the arbor sections in assembly.

A further object of the invention is to provide each of the sections with the slots referred to so that they serve as passages for ventilating purposes to assist in drying a wet line wound on the arbor. The slots also lighten the weight of the sections.

Additional objects or attributes of the invention reside in its simplicity, durability, light weight, and low cost of manufacture.

Other objects and advantages of the invention will become evident after considering the description hereinafter set forth in conjunction with the drawing annexed hereto.

In the drawing:

Figures 1, 2 and 3 exemplify one embodiment of the invention.

Figure 1:
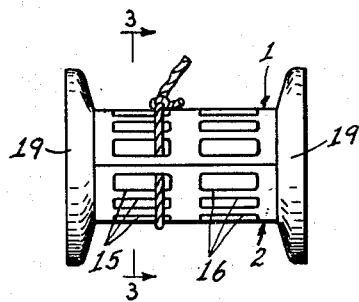
Figure 1 is a front view of a conventional reel spool showing the arbor embodying the invention applied thereto.
Figure 2:
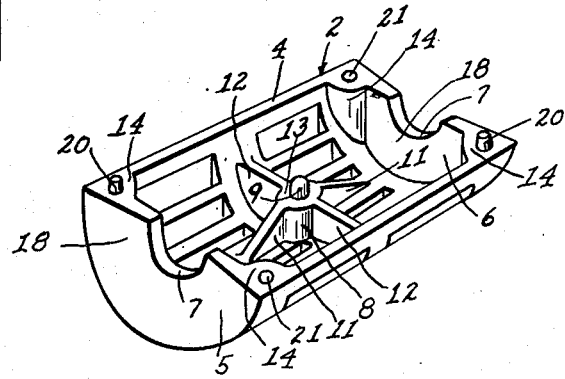
Figure 2 is a perspective view of one of the arbors showing the internal structure thereof.
Figure 3:
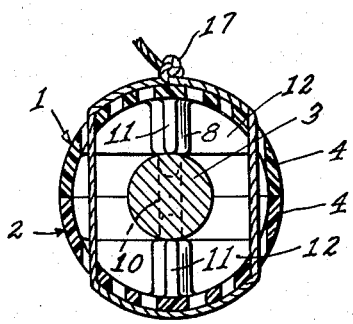
Figure 3 is a transverse section taken substantially on line 3—3 of Figure 1 depicting the manner of keying the arbor sections to the shaft, and mode of connecting a fish line to such sections.

The arbor, embodying the improved principles of design and construction of the subject invention exemplified in Figures 1, 2 and 3 of the drawing, is preferably comprised of two sections generally designated 1 and 2, which are substantially identical in character and constructed of some desirable material impervious to water, such as moulded plastic having properties suitable for the purposes above described.

Each of the arbor sections is preferably made in the form of a shell substantially semi-cylindrical in character. The sections, when assembled on a conventional shaft 3 of a fishing reel spool, provide a firm cylindrical supporting surface for a line or ribbon material. More specifically, each section includes, among other things, a semi-cylindrical line supporting wall 4 of substantially uniform thickness, a pair of inturned longitudinally spaced corresponding radial end walls or portions 5 and 6 provided with circular bearing surfaces 7 which engage the shaft 3. Each shell is also provided with a centrally disposed generally cylindrical formation or post 8 having a projection or key 9 thereon which is adapted for insertion in the conventional line receiving hole 10 of a shaft of a reel spool for keying each section to the shaft. The formation 8 and the cylindrical wall 4 are preferably reinforced by web structure comprising a pair of longitudinal ribs 11 and a pair of transverse ribs 12. The end of the formation 8 is formed to provide a bearing surface 13 for engaging the shaft. The bearing surfaces 7 and 13 on the sections are substantially aligned and spaced so as to firmly support the arbor sections on the shaft. As clearly shown in Figure 2, the end walls and cylindrical wall are reinforced or braced at their junctions by fillet formations or enlargements 14.

The wall 4 of each arbor section is provided with a plurality or row of longitudinal slots 15 between the end wall 5 and transverse ribs 12 and a plurality or row of similar slots 16 between these ribs and the end wall 6. These slots extend through the wall and serve as passages through which air may circulate whereby to assist in drying a wet line on the arbor. These slots also serve to lighten the weight of the arbor and provide passages through which line material can be inserted to assist in securing the sections together about the shaft as clearly illustrated in Figure 3. When the sections are assembled with a shaft, the rows of slots 15 and 16 in the respective sections are aligned so that a line can be readily threaded chordally through the outermost slots in the row 15 and about the sections and then tied as indicated at 17 in Figure 3. Obviously, the line may be threaded through any of the aligned slots for the purpose specified.

As clearly exemplified in the drawings, the end walls or portions 5 and 6 of the arbor sections are preferably slightly dished inwardly as indicated at 18 so that only the peripheral edge portions of the walls or marginal end edges of the cylindrical walls 4 will intimately engage the convex surfaces of the spool flanges 19 of the spool. In other words, the end walls receive in a sort of nesting relationship portions of the spool flanges. Such an arrangement serves to prevent the line from receding and becoming caught between the ends of the sections and the spool flanges.

The locking means employed to secure the arbor sections about the spool shaft may be designed and constructed in various ways, but as illustrated in Figure 2, each section is provided with a pair of corresponding tapered pins or tenon-like projections 20 and a pair of corresponding tapered sockets or holes 21. More particularly in this respect, each of the end walls is provided with a pin and a socket so that the pairs of pins and pairs of sockets are respectively diagonally arranged on opposite sides of the longitudinal axis of each section. Thus, each section is provided with two pairs of corresponding or identical locking components. The pins and sockets are so constructed that the sockets yieldably or snugly receive the pins to detachably hold the arbor sections on the shaft sufficiently to prevent accidental separation therefrom. It will be noted that the axes of the pins and sockets extend in chordal directions through the sections.

To assemble the sections about the shaft is a relatively simple matter because it is merely necessary to manipulate them into a position so that the pins will register with the sockets and then press the sections together so that the walls 4 will provide a cylindrical line material supporting surface. After the sections have been secured about the spool shaft, a line can be suitably threaded through any of the slots for the purpose described above.

Figure 4:
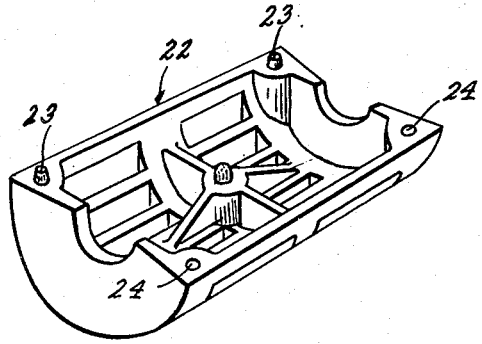
Figure 4 is a perspective view showing one of a pair of arbor sections exemplifying a second embodiment of the invention.

Referring to Figure 4 of the drawing the arbor section 22 shown therein substantially corresponds to the section shown in Figure 2, except that the pair of pins 23 and the pair of sockets 24 are located on opposite sides of the longitudinal axis of the section. A pair of arbor sections such as 22 are assembled in substantially the same manner as the sections 1 and 2 are assembled.

Variations from the particular constructions and arrangements above disclosed may be resorted to by the exercise of skill in the art, without departure from the spirit or scope of the invention.

I claim:

A pair of arbor sections for a shaft having convex end flanges, each of said sections comprising a substantially semi-cylindrical shell forming an outer material supporting wall with internal web structure for reenforcing the section and providing means for bearing against a shaft, means on each of the bearing means for keying each section to a shaft, means for securing the sections about a shaft to form an arbor therefor, the outer wall of each section having a slot therein for receiving a line material so as to assist in securing the sections together, and each of said sections also having substantially identical concave end walls which are equally spaced from the center of the section and adapted to receive portions of the convex end flanges on the shaft so as to prevent recession of a line material between the end walls and end flanges.

References Cited in the file of this patent

UNITED STATES PATENTS

| | | |
|---|---|---|
| 806,064 | Carter | Nov. 28, 1905 |
| 823,401 | Ferris | June 12, 1906 |
| 1,827,875 | Hlavac | Oct. 20, 1931 |
| 1,832,590 | Sponable et al. | Nov. 17, 1931 |
| 1,855,738 | Case | Apr. 26, 1932 |
| 2,336,981 | Clickner | Dec. 14, 1943 |
| 2,344,665 | Adams | Mar. 21, 1944 |
| 2,669,399 | Wood | Feb. 16, 1954 |

FOREIGN PATENTS

| | | |
|---|---|---|
| 265,489 | Switzerland | Sept. 16, 1950 |